US012631888B2

(12) United States Patent
Gugel et al.

(10) Patent No.: US 12,631,888 B2
(45) Date of Patent: May 19, 2026

(54) OPTICAL APPARATUS

(71) Applicant: Leica Microsystems CMS GmbH, Wetzlar (DE)

(72) Inventors: Hilmar Gugel, Dossenheim (DE); Ingo Boehm, Heidelberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 697 days.

(21) Appl. No.: 17/898,498

(22) Filed: Aug. 30, 2022

(65) Prior Publication Data

US 2023/0067865 A1     Mar. 2, 2023

(30) Foreign Application Priority Data

Sep. 2, 2021     (EP) ..................................... 21194658

(51) Int. Cl.
| | |
|---|---|
| *G02B 27/28* | (2006.01) |
| *G02B 21/06* | (2006.01) |
| *G02B 27/14* | (2006.01) |
| *G02B 5/28* | (2006.01) |

(52) U.S. Cl.
CPC ........... *G02B 27/283* (2013.01); *G02B 21/06* (2013.01); *G02B 27/141* (2013.01); *G02B 5/285* (2013.01)

(58) Field of Classification Search
CPC ...... G02B 5/285; G02B 21/06; G02B 27/141; G02B 27/283
USPC ........................................................ 359/485
See application file for complete search history.

(56) References Cited

U.S. PATENT DOCUMENTS

2019/0258043 A1     8/2019   Kuebler

FOREIGN PATENT DOCUMENTS

| EP | 2 463 700 A1 | 6/2012 |
|---|---|---|
| EP | 3 667 299 A1 | 6/2020 |
| WO | WO 2012/083206 A1 | 6/2012 |

OTHER PUBLICATIONS

Brustlein Sophie et al: "Double-clad hollow core photonic crystal fiber for coherent Raman endoscope", Optics Express, vol. 19, No. 13, Jun. 14, 2011 (Jun. 14, 2011), pp. 12562-12568, XP055893513, The Optical Society, US.

(Continued)

*Primary Examiner* — Bumsuk Won
*Assistant Examiner* — Grant A Gagnon
(74) *Attorney, Agent, or Firm* — LEYDIG, VOIT & MAYER, LTD.

(57)     ABSTRACT

An optical apparatus for examining a sample includes: an illumination unit for emitting illumination light in an illumination wavelength range onto the sample; a detection unit for collecting detection light in a detection wavelength range from the sample, the illumination wavelength range and the detection wavelength range partially overlapping in an intermediate wavelength range; and a light separating device for separating the illumination light and the detection light, the light separating device including a beam splitter having: a first splitting characteristic with one of transmitting and reflecting light of at least a first polarization state in the illumination wavelength range excluding the intermediate wavelength range; and a polarization-dependent second splitting characteristic with the one of transmitting and reflecting light of the first polarization state and the other of transmitting and reflecting light of a second polarization state in the intermediate wavelength range.

16 Claims, 9 Drawing Sheets

(56) References Cited

OTHER PUBLICATIONS

Wang Chun-Chin et al: "In situ chemically specific mapping of agrochemical seed coatings using stimulated Raman scattering microscopy", Journal of Biophotonics, [Online] vol. 11, No. 11, Jul. 18, 2018 (Jul. 18, 2018), XP055893542, Wiley-VCH, Germany, pp. 1-7.

Tarun Alvarado et al: "Highly efficient heating assisted tip-enhanced Raman spectroscopy", Proceedings of SPIE, [Online] vol. 7033, Aug. 27, 2008 (Aug. 27, 2008), p. 70330C, XP055893549, US.

Iridian Spectral Technologies: "The Role of Edge Pass Filters in Raman Spectroscopy", Apr. 28, 2020 (Apr. 28, 2020), pp. 1-21, XP055893675, AZoNetwork, Australia.

Reichman Jay: "Handbook Of Optical Filters For Fluorescence Microscopy", Jun. 30, 2017, pp. 1-44, XP055893654, Chroma Technology Group, US.

Brustlein, Sophie et al.; "Optical Parametric Oscillator-Based Light Source for Coherent Raman Scattering Microscopy: Practical Overview"; *Journal of Biomedical Optics*; Feb. 1, 2011; pp. 1-10; vol. 16, No. 2; XP55322045; SPIE; Bellingham, WA, USA.

Reichman, Jay; "Handbook of Optical Filters for Fluorescence Microscopy"; Jun. 1, 1998; pp. 1-37; XP55649664; Chroma Technology Corp.; Brattleboro, VT, USA.

<u>116</u>

OPTICAL APPARATUS

CROSS-REFERENCE TO PRIOR APPLICATION

Priority is claimed to European Patent Application No. EP 21194658.7, filed on Sep. 2, 2021, the entire disclosure of which is hereby incorporated by reference herein.

FIELD

The present invention relates to an optical apparatus for examining a sample, comprising an illumination unit configured to emit illumination light in an illumination wavelength range onto the sample, a detection unit configured to collect detection light in a detection wavelength range from the sample, and a light separating device configured to separate the illumination light and the detection light.

BACKGROUND

The field of nonlinear microscopy includes various methods, such as fluorescence microscopy, e.g. multiphoton excitation microscopy, coherent anti-Stokes Raman scattering microscopy (CARS), stimulated Raman scattering microscopy (SRS) as well as microscopic methods that detect higher harmonics of the excitation wavelength such as Second-Harmonic Generation microscopy (SHG) and Third-Harmonic (THG) Generation microscopy.

It is desirable to combine several of these methods in one setup and thus configure a so-called multimodal microscope. However, it is a challenge in a multimodal configuration to separate the detection light from the illumination light and/or to separate the detection light which is acquired in different microscopic methods as the light to be separated may overlap spectrally.

In the field of microscopy, there are basically two fundamentally different approaches to implement light separation. Firstly, a dichroic beam splitter may be used to separate different light components in terms of their spectral composition. For instance, an optical long-pass filter has a spectral filter characteristic according to which light with wavelengths greater than a predetermined spectral splitting edge are transmitted, while light with wavelengths smaller than the spectral splitting edge are reflected. Secondly, a polarizing beam splitter may be used to separate different light components in terms of their polarization. Such a polarizing beam splitter may have a polarization-dependent splitting characteristic according to which linearly polarized of one kind, e.g. parallel-polarized light (hereinafter "P-pol light") is transmitted, while linearly polarized light of the other kind, e.g. perpendicular-polarized light (hereinafter "S-pol light") is reflected, or vice versa.

In fluorescence microscopy, such as multiphoton excitation microscopy, the separation of the excitation light and the detection light is usually achieved by dichroic beam splitters, which transmit at least one wavelength range while reflecting another. In microscopic methods like CARS as well as SHG and THG dichroic beam splitters are utilized likewise for separating illumination light and detection light. In contrast, for instance in SRS microscopy, the detection light is in the same wavelength range as a part of the illumination light. Accordingly, a wavelength-dependent light separation using a dichroic beam splitter is not possible in SRS. Rather, a polarizing beam splitter has to be used.

As a result, it is difficult to combine different microscopic methods that apply, on the one hand, wavelength-dependent light separation such as multiphoton excitation microscopy, CARS, SHG, THG, and, on the other hand, polarization-dependent light separation such as SRS, without causing a significant loss of light, in particular a loss of detection light.

SUMMARY

In an embodiment, the present disclosure provides an optical apparatus for examining a sample, comprising: an illumination unit configured to emit illumination light in an illumination wavelength range onto the sample; a detection unit configured to collect detection light in a detection wavelength range from the sample, the illumination wavelength range and the detection wavelength range partially overlapping in an intermediate wavelength range; and a light separating device configured to separate the illumination light and the detection light, the light separating device comprising a beam splitter having: a first splitting characteristic with one of transmitting and reflecting light of at least a first polarization state in the illumination wavelength range excluding the intermediate wavelength range; a polarization-dependent second splitting characteristic with the one of transmitting and reflecting light of the first polarization state and the other of transmitting and reflecting light of a second polarization state in the intermediate wavelength range; and a third splitting characteristic with an other of transmitting and reflecting light of both the first polarization state and the second polarization state in the detection wavelength range excluding the intermediate wavelength range.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
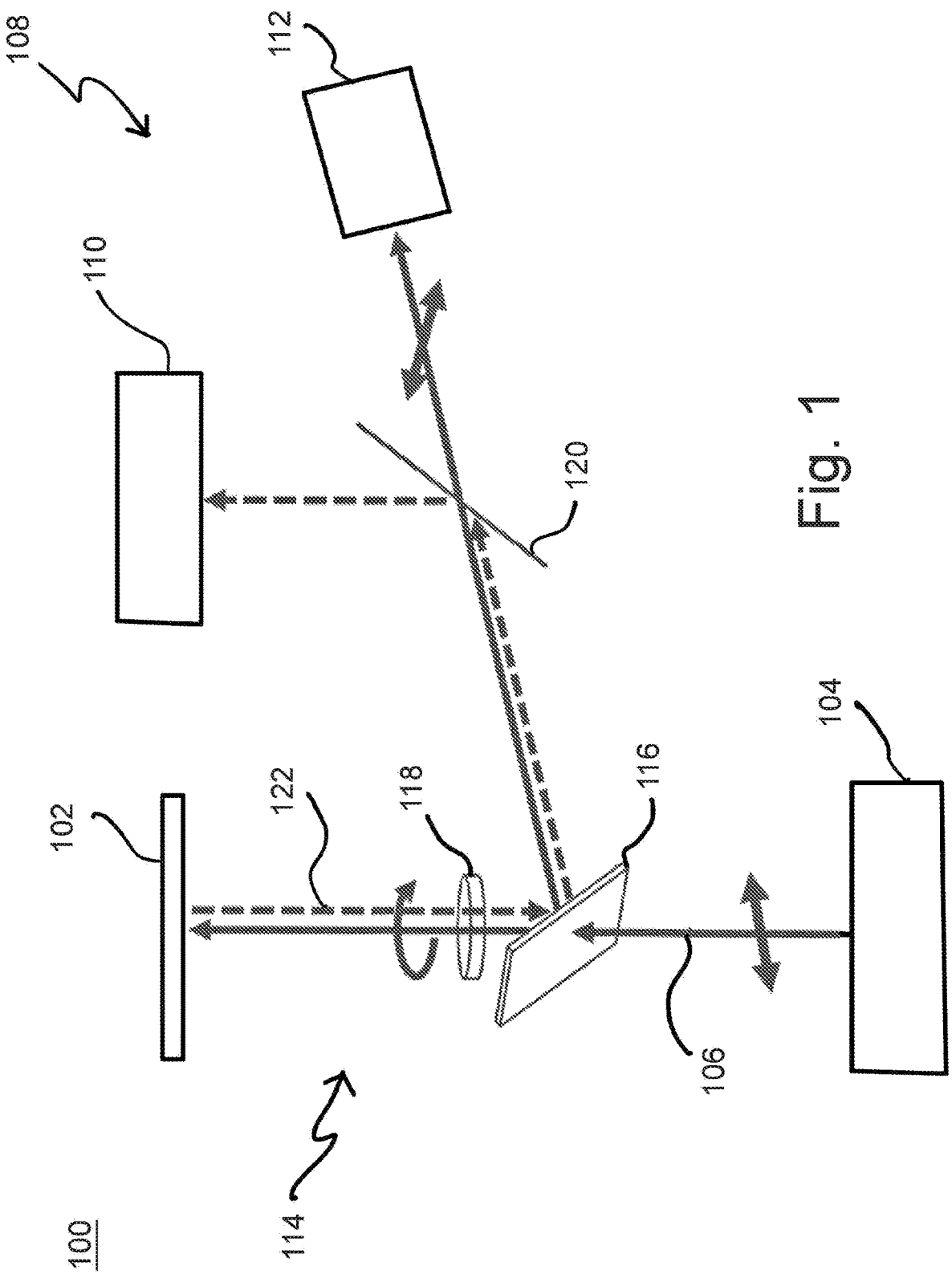
FIG. 1 is a schematic view of an optical apparatus including a light separating device for separating illumination light and detection according to an embodiment.

In an embodiment, the present disclosure provides an optical apparatus and a method for examining a sample which allow to separate illumination light and detection light with high light efficiency.

An optical apparatus for examining a sample comprises an illumination unit configured to emit illumination light in an illumination wavelength range onto the sample. The optical apparatus further comprises a detection unit configured to collect detection light in a detection wavelength range from the sample. The illumination wavelength range and the detection wavelength range partially overlap in an intermediate wavelength range. The optical apparatus further comprises a light separating device configured to separate the illumination light and the detection light. The light separating device comprises a beam splitter. The beam splitter has a first splitting characteristic with one of transmitting and reflecting light of at least a first polarization state in the illumination wavelength range excluding the intermediate wavelength range. The beam splitter has a polarization-dependent second splitting characteristic with said one of transmitting and reflecting light of the first polarization state and the other of transmitting and reflecting light of a second polarization state in the intermediate wavelength range. The beam splitter has a third splitting characteristic with the other of transmitting and reflecting light of both the first polarization state and the second polarization state in the detection wavelength range excluding the intermediate wavelength range.

The optical apparatus is designed to combine wavelength-dependent light separation and polarization-dependent light separation. Therefore, the optical apparatus can be used in a multimodal configuration in which the detection light and the illumination light spectrally overlap. For example in case of SRS, the wavelength range of the detection light lies within the wavelength range of the illumination light so that the illumination light and the detection light is to be separated in terms of polarization. In contrast, other microscopic method such as multiphoton excitation microscopy, CARS, SHG, and THG allow for a wavelength-dependent separation between illumination light and detection light as there is no spectral overlap between illumination and detection.

To enable a combination of a polarization-dependent method such as SRS with a wavelength-dependent method such as multiphoton excitation microscopy, CARS, SHG, and/or THG, the optical apparatus comprises a beam splitter having unique splitting characteristics. In particular, the beam splitter has three different splitting characteristics in three successive wavelength bands.

A first splitting characteristic of the beam splitter is associated with a first wavelength band which is given by the illumination wavelength range excluding, i.e. without an intermediate wavelength range in which the illumination wavelength range and the detection wavelength range partially overlap. In the first wavelength band, the beam splitter serves to either transmit or reflect the illumination light. In particular, the beam splitter is configured to either transmit or reflect at least a first polarization state, for instance P-pol light or S-pol light. In the exemplary case that the dichroic beam is designed to transmit (or reflect) P-pol light in the first wavelength band, i.e. in the illumination wavelength range excluding the intermediate range, the first splitting characteristic may be indeterminate with respect to S-pol light. In other words, it is only the transmittance (or reflectance) with respect to P-pol light but not the transmittance (or reflectance) with respect to S-pol light which is to be optimized when designing the beam splitter in this example. This allows a certain freedom of design which makes it easier to achieve the desired spectral characteristics. In this respect, it should be taken into account that a polarization-dependent loss of illumination light can be easily compensated by suitably controlling the amount of light emitted from the illumination unit. In contrast, a polarization-dependent loss of detection light would be much more detrimental as the intensity of detection light may be by orders of magnitudes lower than the intensity of the illumination light.

A second, polarization-dependent splitting characteristic of the beam splitter is associated with a second wavelength band which is given by the intermediate wavelength range. Within the intermediate wavelength range that constitutes a spectral overlap between the illumination light and the detection light, the beam splitter serves as a polarizing splitting element which either transmits or reflects the incident light depending on its polarization. For example, assumed that the beam splitter transmits P-pol light in the first wavelength band, the beam splitter also transmits P-pol light in the second wavelength band. In contrast, S-pol light is reflected by the beam splitter in the second wavelength band in this example.

A third splitting characteristic of the beam splitter is associated with a third wavelength band which is given by the detection wavelength range excluding, i.e. without the intermediate wavelength range. For example, assumed that the beam splitter transmits P-pol light in the first wavelength range band, the beam splitter reflects both P-pol light and S-pol light in the third wavelength range. Accordingly, the beam splitter is designed to reflect substantially all light in the third wavelength range, regardless of its polarization. As a result, there is almost no loss of detection light in the third wavelength band.

In conventional systems, essentially 50% of the detection light are lost when using polarizing beam splitters for light separation. Compared thereto, the optical apparatus enables light separation with high light efficiency. As a result, the optical apparatus can advantageously be used to implement a multimodal configuration. For instance, when combining SRS with multiphoton excitation microscopy, CARS, SHG, and/or THG, the intermediate wavelength range is used in the SRS mode for both illumination and detection. Rather, in a mode for performing excitation multiphoton microscopy, CARS, SHG, or THD, illumination light and detection light are separated from each other with regard to their wavelength ranges. In all modes, almost the entire detection light can be collected without loss. Furthermore, the entire detection light that is collected in multimodal microscopy can be coupled out of a common optical path for illumination and detection at one port.

Accordingly, the technical solution proposed herein combines different light separation methods, namely spectral splitting and polarization splitting, in one single component that has both dichroic-splitting properties and polarization-splitting properties. This component is essentially formed by the beam splitter as described above, the beam splitter having a unique polarization-dependent splitting characteristic at its spectral splitting edge. The polarization splitting at the spectral splitting edge is adapted to the width of the intermediate wavelength range which in turn determines the overlapping wavelength range e.g. in SRS. In particular, the spectral width of the polarization splitting at the splitting edge is significantly enlarged compared to a conventional dichroic beam splitter that is configured to separate light according to its wavelengths.

As already mentioned above, the first and second polarization states may be linearly polarized states, e.g. P-pol light and S-pol light, which are orthogonal to each other.

According to a preferred embodiment, the light separating device comprises at least one dichroic beam splitting element arranged in an optical path of the detection light which is output from the beam splitter. The dichroic beam splitting element may have a wavelength-dependent splitting characteristic in the detection wavelength range with transmitting light in one of the detection wavelength range excluding the intermediate wavelength range and the intermediate wavelength range and reflecting light in the other of the detection wavelength range excluding the intermediate wavelength range and the intermediate wavelength range. The dichroic beam splitting element can be used to separate the different light components of the detection light and to direct these onto different detectors which are included in the detector unit. For instance, SRS detection signals which may represent intensity changes of a pump beam, can be separated by means of a lock-in amplifier. This makes the signal processing in SRS essentially different from the signal processing e.g. fluorescence microscopy such as multiphoton excitation microscopy. The SRS detection light and the detection light of multiphoton excitation microscopy significantly differ in their wavelength ranges and can therefore be efficiently separated by means of the dichroic beam splitting element.

The illumination unit may be configured to emit the illumination light in a linearly polarized state towards the beam splitter. To this purpose, the illumination unit may comprise a wave plate, e.g. a half-wave plate, which adjusts the polarization of the illumination light to the first splitting characteristic of the beam splitter. For example, in case that the first splitting characteristic is selected such that P-pol light is transmitted by the beam splitter in the illumination wavelength range, the wave plate is configured to create P-pol illumination light.

Preferably, the light separating device comprises another wave plate, e.g. a quarter-wave plate, which is arranged in a common optical path of the illumination light output from the beam splitter and the detection light input to the beam splitter. The aforementioned common optical path is thus arranged between the beam splitter and the sample.

Preferably, the wave plate may be configured to adjust a polarization state of the detection light in the detection wavelength range to the second polarization state. In case that the illumination light is linearly polarized, the wave plate converts the linearly polarized light into circularly polarized light. On the other hand, the detection light is converted by the wave plate from circularly polarized light into linearly polarized light, the polarization direction of the latter being rotated by 90° with respect to the polarization direction of the illumination light. Thus, due to the different polarization directions, the detection light is separated from the illumination light by the beam splitter.

As already mentioned above, the beam splitter may have a splitting edge whose spectral width is adapted to the intermediate wavelength range. The splitting edge is to be understood as a wavelength range in which the polarization splitting occurs. More specifically, the splitting edge may be defined by two wavelengths at which the transmission/reflection characteristic with respect to two linearly polarized light components changes from transmission to reflection, respectively, or vice versa. Compared to a conventional dichroic beam splitter having a quite narrow splitting edge of a few nanometers in which polarization splitting occurs, the spectral width of the splitting edge of the present beam splitter is relatively large in order to provide a reasonably wide intermediate wavelength range in which the light can be separated by polarization splitting as required e.g. in SRS.

For example, the illumination light is formed from the light transmitted by the light separating device, and the detection light is formed from the light reflected by the light separating device. According this embodiment, a large deflection angle of the detection light at the beam splitter can be achieved which is beneficial in terms of a large polarization splitting at the splitting edge of the beam splitter. In this respect, the deflection angle is preferably larger than 80°. Accordingly, a light reflection at an angle of 90° is preferred.

According to a preferred embodiment, the illumination wavelength range has first lower and upper limits, and the detection wavelength range as second lower and upper limits. The first upper limit is larger than the second upper limit. The first lower limit is smaller than the second upper limit and larger than the second lower limit. The intermediate wavelength range is defined by the first lower limit and the second upper limit. According to this embodiment, the beam splitter is adapted to separate illumination light of longer wavelengths from detection light of shorter wavelengths in microscopic applications such as multiphoton excitation microscopy, CARS, SHG, and THG. Further, in an SRS application, the beam splitter is configured to provide for light separation in the intermediate wavelength range that is common to illumination and detection in SRS.

Preferably, the beam splitter is formed from an interference filter including an optical coating formed from a plurality of dielectric layers. In particular, the interference filter may comprise a first prism having a first coupling surface on which the optical coating is arranged, a second prism having a second coupling surface facing the first coupling surface, and a cement layer which is arranged between the optical coating and the second coupling surface and configured to bond the first and second prisms together.

In case that the beam splitter is formed from two prisms which are cemented to each other, the angle of incidence at which the light falls onto the optical coating is preferably 45°. On the other hand, the beam splitter is not limited to such a cemented design. For instance, when using an uncemented configuration which is based on a dichroic filter design, an enlargement of the polarization splitting may be achieved by selecting an angle of incidence which is significantly larger than 45° such as 60°.

Preferably, the optical apparatus may comprise a multimodal microscope which is configured to perform multiphoton excitation microscopy, Coherent anti-Stokes Raman Scattering microscopy, stimulated Raman scattering microscopy, Second-Harmonic Generation microscopy, and/or Third-Harmonic generation microscopy. Although the aforementioned microscopic applications are preferred, the multimodal microscope is not limited thereto. Any microscopic methods using overlapping wavelength ranges that cannot be spectrally separated from each other may be combined.

Preferably, the multimodal microscope is configured to illuminate the sample with the illumination light in the illumination wavelength range when performing multiphoton excitation microscopy, Coherent anti-Stokes Raman Scattering microscopy, stimulated Raman scattering microscopy, Second-Harmonic Generation microscopy, and/or Third-Harmonic generation microscopy. Further, the multimodal microscope is configured to collect the detection light from the sample and the detection wavelength range excluding the intermediate wavelength range when performing when performing multiphoton excitation microscopy, Coherent anti-Stokes Raman Scattering microscopy, Second-Harmonic Generation microscopy, and/or Third-Harmonic generation microscopy. Further, the multimodal microscope is configured to collect the detection light from the sample in the intermediate wavelength range when performing stimulated Raman scattering microscopy.

The intermediate wavelength range may have a spectral width of at least 50 nm, preferably 80 nm, and even better 100 nm. In addition, the total spectral width covering the illumination wavelength range and the detection wavelength including the intermediate wavelength range is from 350 nm to 1100 nm or even better from 350 nm to 1300 nm.

Preferably, the one of light transmission and light reflection of at least the first polarization state is at least 80% in the illumination wavelength range excluding the intermediate wavelength range. Preferably, the one of light transmission light and reflection of the first polarization state is at least 80% in the intermediate wavelength range, and the other of light transmission and at reflection of the second polarization state is at least 80% in the intermediate wavelength range. Preferably, the other of light transmission and light reflection of both the first polarization state and the second polarization state is at least 80% in the detection wavelength range excluding the intermediate wavelength range. By selecting such polarization-dependent splitting characteristics is possible to achieve a light separation with high light efficiency without the filter design becoming too complex According to another aspect, a method for examining a sample is provided. The method comprises following steps: emitting illumination light in an illumination wavelength range onto the sample, and collecting detection light and the detection wavelength range from the sample. The illumination wavelength range and the detection wavelength range partially overlap in an intermediate wavelength range. The illumination light and the detection light are separated by means of a light separating device comprising a beam splitter. The beam splitter has a first splitting characteristic with one of transmitting and reflecting light of at least a first polarization state in the illumination wavelength range excluding the intermediate wavelength range. The beam splitter has a polarization-dependent second the characteristic with the one of transmitting and reflecting light of the first polarization state and the other of the transmitting and reflecting light of the second polarization state in the intermediate wavelength range. The beam splitter has a third splitting characteristic with the other of transmitting and reflecting light of both the first polarization state and the second polarization state in the detection wavelength range excluding the intermediate wavelength range.

FIG. 1 is a schematic view of an optical apparatus 100 according to an embodiment. The optical apparatus 100 may be configured as a multimodal microscope to examine a sample 102 according to multiple microscopic methods. Without being limited thereto, the optical apparatus 100 may serve to combine different microscopic applications such as, on the one hand, fluorescence microscopy, e.g. multiphoton excitation microscopy, CARS, SHG, and THG which use different wavelength ranges for illumination and detection, and, on the other hand, SRS which in contrast uses partially overlapping wavelengths for illumination and detection. It is to be noted that FIG. 1 is a simplified illustration showing only those components of the optical apparatus 100 which are helpful to understand the operating principle.

The optical apparatus 100 includes an illumination unit 104 which may comprise one or more laser light sources configured to emit illumination light 106. For example, one or more short-pulse lasers can be used for generating the illumination light 106. Laser light sources with different pulse lengths in the sub-picosecond range and also above one picosecond can be used. In case of multiple laser light sources, the illumination unit 104 may include one or more beam combining elements such as a dichroic beam combiner to form a single illumination beam from a plurality of laser beams of different wavelengths.

The optical apparatus 100 further comprises a detection unit 108 that is configured to collect detection light 122 from the sample 102. The detection unit 108 may comprise multiple detectors 110, 112 in accordance with the different microscopic applications that are combined in the multimodal microscope. For instance, in case of SRS, the detector 112 may include a lock-in amplifier which is configured to acquire an SRS signal from the detection light 122.

The optical apparatus 100 includes a light separating device 114 which serves to separate the illumination light 106 and the detection light 122 with regard to wavelength and polarization. To this purpose, the light separating device 114 comprises a beam splitter 116 that has both dichroic-splitting properties and polarization-splitting properties as explained in more detail below.

The optical apparatus 100 comprises a wave plate 118. According to the embodiment shown in FIG. 1, the wave plate 118 is configured as quarter-wave plate. Furthermore, in an optical path of the detection light 122 reflected by the beam splitter 116, a dichroic beam splitting element 120 is provided. The dichroic beam splitting element 120 is configured to spectrally split the detection light 122 into light components of different wavelengths in accordance with the different microscopic applications that are combined in the multimodal microscope. A spectral component of the detection light 122 transmitted by the dichroic beam splitting element 120 propagates towards the detector 112 that is used in the SRS mode. In contrast, a spectral component of the detection light 122 reflected by the dichroic beam splitting element 120 propagates towards the detector 110 that is used in the other microscopic modes.

According to the embodiment shown in FIG. 1, the illumination unit 104 emits illumination light 106 in a linearly polarized state towards the beam splitter 116. To this purpose, the illumination unit 104 may comprise a wave plate such as a half-wave plate which converts the laser light into linearly polarized light.

Figure 2:
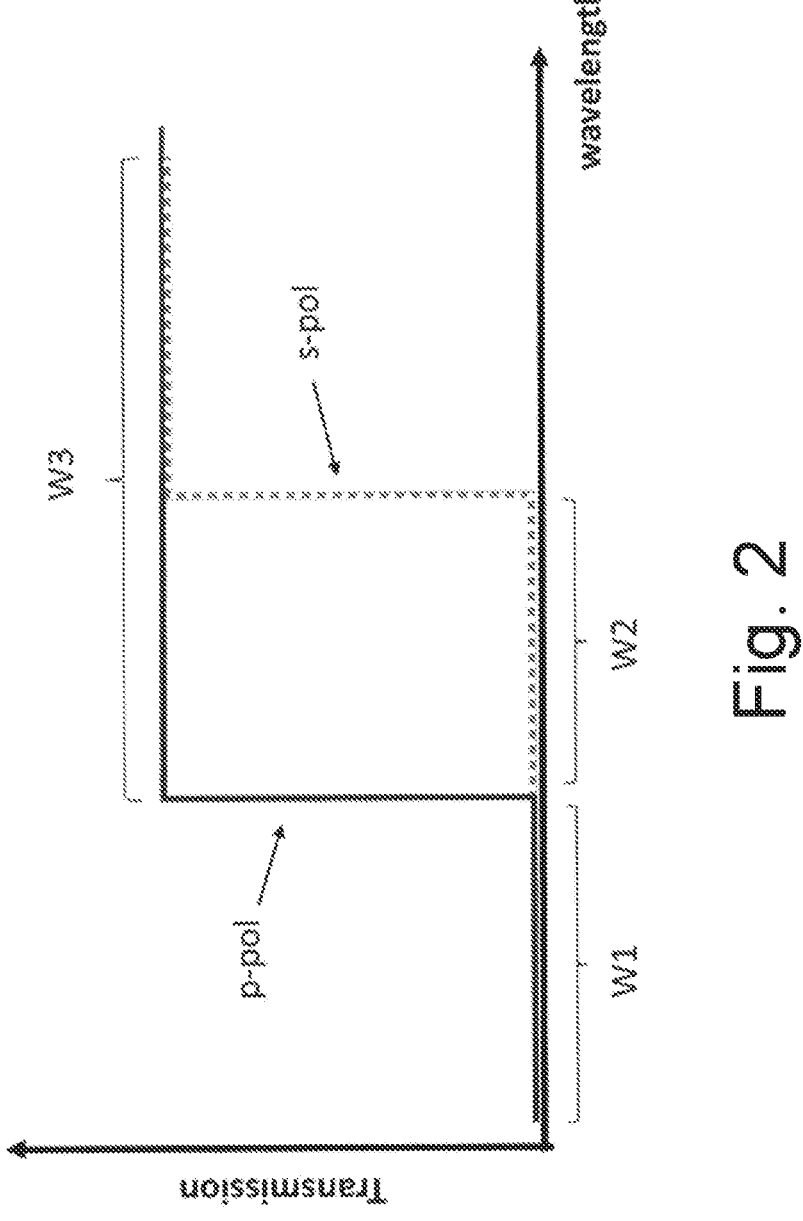
FIG. 2 shows a theoretical wavelength-dependent splitting characteristic of a beam splitter included in the light separating device according to the embodiment.
Figure 3:
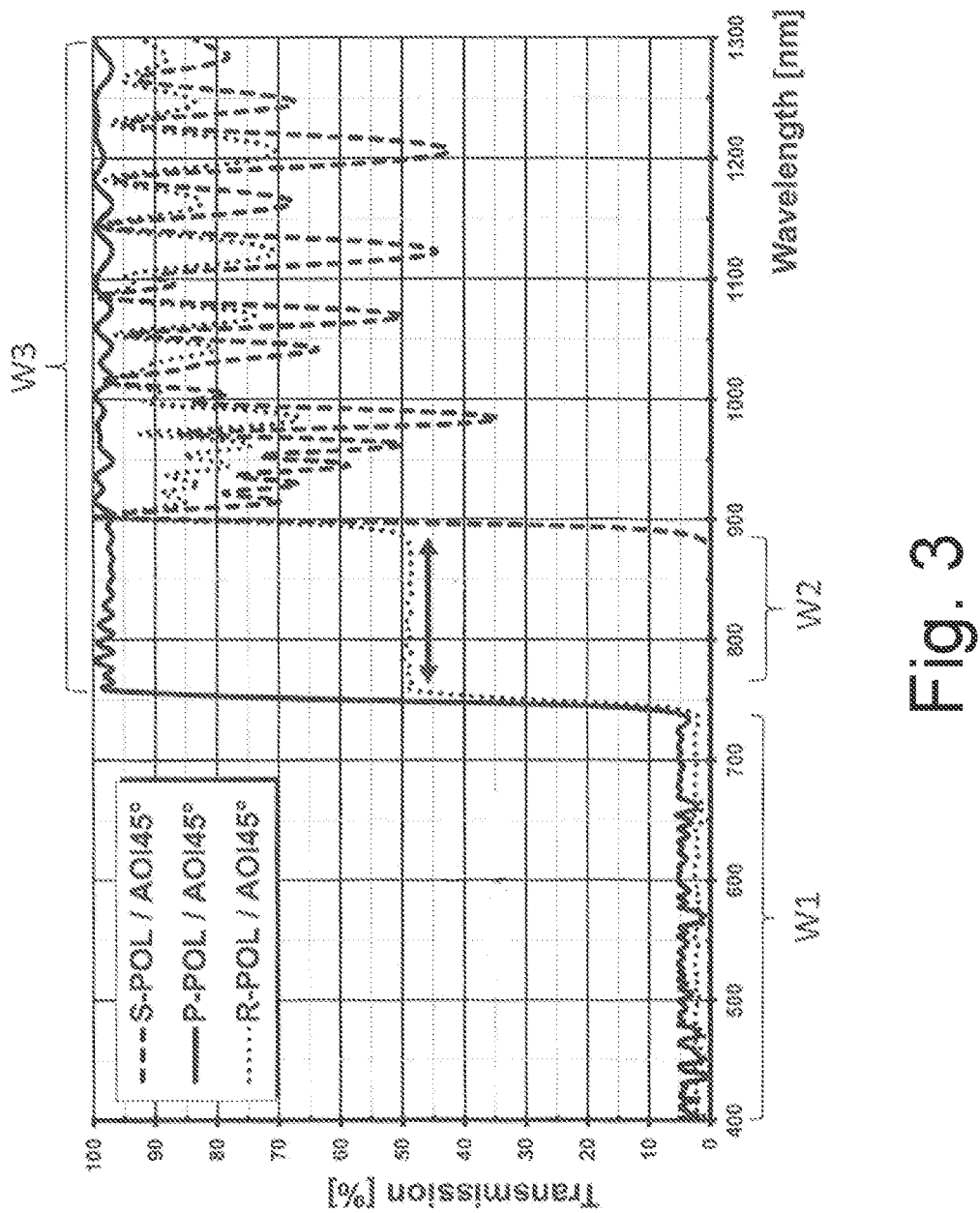
FIG. 3 shows a real wavelength-dependent splitting characteristic according to an embodiment.

Hereinafter, it is assumed by way of example that the illumination unit 104 generates the illumination light 106 as P-pol light which is first directed onto the beam splitter 116 and then emitted onto the sample 102. Based on this exemplary assumption, the beam splitter 116 is configured to have wavelength-dependent and polarization-dependent splitting characteristics as shown in FIGS. 2 and 3. In each of the FIGS. 2 and 3, the abscissa designates the wavelength of the light falling onto the beam splitter 116, and the ordinate designates a transmission indicating the amount of light that is transmitted (rather than reflected) by the beam splitter 116. Further, FIG. 2 shows a theoretical (ideal) splitting characteristic. In contrast, FIG. 3 shows a splitting characteristic which is achieved based on a real filter design of the beam splitter 116.

According to the embodiment shown in FIGS. 1 to 3, it is assumed that the illumination unit 104 is configured to emit the illumination light 106 in a wavelength range W3. As shown by way of example in FIG. 3, the illumination wavelength range W3 may be from about 750 nm to 1300 nm. Further, it is assumed that the detection light 122 is in a wavelength range e.g. from 400 to about 900 nm as illustrated FIG. 3. Accordingly, the illumination wavelength range W3 and the detection wavelength range partially overlap in an intermediate wavelength range W2 which is from 750 nm to 900 nm in the example illustrated in FIG. 3. In FIGS. 2 and 3, the detection wavelength range excluding the intermediate wavelength range W2 is referred to as W1. Furthermore, "AOI45°" in FIG. 3 indicates that the angle of incidence is 45° in the present embodiment.

In the present embodiment, it is assumed that the wavelength range W3 is used for illumination both in a first mode such as multiphoton excitation microscopy, CARS, SHG and THG, and in a second mode such as SRS. It is further assumed that in multiphoton excitation microscopy, CARS, SHG and THG the wavelength of the detection light 122 is in the wavelength range W1. In SRS, the wavelength of the detection light 122 is in the wavelength range W2. Thus, in SRS, the illumination light 106 and the detection light 122 spectrally overlap in the intermediate wavelength range W2. In contrast, in multiphoton excitation microscopy, CARS, SHG and THG, the illumination light 106 and the detection light 122 are spectrally separated.

Accordingly, three successive wavelength bands from shorter to longer wavelengths can be distinguished. A first wavelength band is given by the illumination wavelength range W3 excluding the intermediate wavelength range W2. Hereinafter, the first wavelength band is referred to as W3-W2 ("W3 minus W2"). A second wavelength band is identical to the intermediate wavelength range W2 where the detection wavelength range W1 and the illumination wavelength range W3 spectrally overlap. A third wavelength band is given by the detection wavelength range excluding the intermediate wavelength range W2, i.e. without the wavelength range W2 that is associated with the SRS detection. Thus, the third wavelength band is identical to the wavelength range W1, and the entire detection wavelength range may be referred to as W1+W2 ("W1 plus W2").

Under this exemplary assumptions, the transmission characteristic of the beam splitter 116, which depends on both wavelength and polarization, is preferably selected as shown in the theoretical characteristics of FIG. 2. Thus, in the first wavelength band W3–W2, the beam splitter 116 has a first splitting characteristic according to which P-pol light is transmitted. In the second wavelength band W2, the beam splitter 116 has a second splitting characteristic according to which P-pol light is transmitted and S-pol light is reflected. In the third wavelength band W1, the beam splitter 116 has a third splitting characteristic according to which both P-pol light and S-pol light are reflected.

As can be seen from FIGS. 2 and 3, the second and third splitting characteristics define a combined splitting characteristic in the detection wavelength range W1+W2 that enables the entire detection light 122 to be supplied to the detection unit 108, regardless of the mode applied. This is achieved by reflecting both P-pol light and light S-pol light in the first wavelength band W1 which is provided in the mode for multiphoton excitation microscopy, CARS, SHG or TSG mode, and by transmitting P-pol light and reflecting S-pol light in the SRS mode. In particular, the second splitting characteristic in the second wavelength band W2 ensures that randomly polarized light (hereinafter "R-pol"), which is considered to be a superposition of P-pol light and S-pol light, is transmitted and reflected in the intended manner as shown in FIG. 3.

Furthermore, it is evident from the splitting characteristic shown in FIG. 3 that the first splitting characteristic in the first wavelength band W3–W2 is only determined with respect to P-pol light which is transmitted almost 100%. In contrast, the first splitting characteristic is not required to be determined with respect to S-pol light as can be seen from the fluctuations of the S-pol light in the first wavelength band W3-W2.

Taking into account the unique splitting characteristics of the beam splitter 116 as shown in FIGS. 2 and 3, the optical apparatus 100 operates as follows:

The illumination unit 104 emits the P-pol illumination light 106 in the illumination wavelength range W3 towards the beam splitter 116 which transmits the P-pol illumination light 106. When passing through the quarter-wave plate 118 towards the sample 102, the P-pol illumination light 106 is converted into circularly polarized light.

In the first wavelength band W1, the detection light 122 emerging from the sample 102 is unpolarized at least in case of fluorescence light. In the first wavelength band W1, the entire detection light 122 is reflected by the beam splitter 116 towards the dichroic beam splitting element 120 regardless of its polarization. Furthermore, the dichroic splitting element 120 is configured to reflect the detection light 122 in the first wavelength band W1 towards the detector 110. Accordingly, in microscopic applications such as multiphoton excitation microscopy, CARS, SHG and THG, where the illumination light 106 and the detection light 122 are included in the spectrally separated, i.e. non-overlapping wavelength ranges W3 and W1, respectively, the beam splitter 116 operates as a dichroic beam splitter which is configured to separate the illumination light 106 and the detection light 122 with respect to their wavelengths.

In contrast, in a microscopic application such as SRS, where the illumination light 106 and the detection light 122 spectrally overlap in the intermediate wavelength range W2, the beam splitter 116 operates as a polarizing beam splitter which is configured to separate the illumination light 106 and the detection light 122 with respect to their polarizations. Thus, in the SRS mode, the detection light 122 emerges from the sample 102 as circularly polarized light. As it passes through the quarter-wave plate 118, the circularly polarized detection light 122 is converted into linearly polarized light, more specifically in S-pol light in this example. Accordingly, the polarization of the S-pol detection light 122 in the second wavelength band W2 is rotated by 90° with respect to the P-pol illumination light 106 in the wavelength band W2. Since the polarization is rotated by 90° relative to the illumination light 106, the detection light 122 is reflected by the beam splitter 116 in the second wavelength band W2 which is the intermediate wavelength range where the illumination wavelength range W3 and the detection wavelength range W1+W2 spectrally overlap. The dichroic splitting element 120 is configured to transmit light in the second wavelength band W2 towards the detector 112. Thus, according the embodiment shown in FIG. 1, S-pol detection light 122 is transmitted in the second wavelength band W2 onto the detector 112.

As can be seen from FIGS. 2 and 3, the beam splitter 116 has a splitting edge which is defined by the intermediate wavelength range W2. Thus, the splitting edge determines a wavelength range in which the polarization splitting occurs. In the example shown in FIG. 3, the splitting edge is defined by a lower wavelength at around 750 nm and a longer wavelength at around 900 nm. Accordingly, the spectral width of the splitting edge is about 150 nm and therefore adapted to a wavelength range suitable for SRS.

Figure 4:
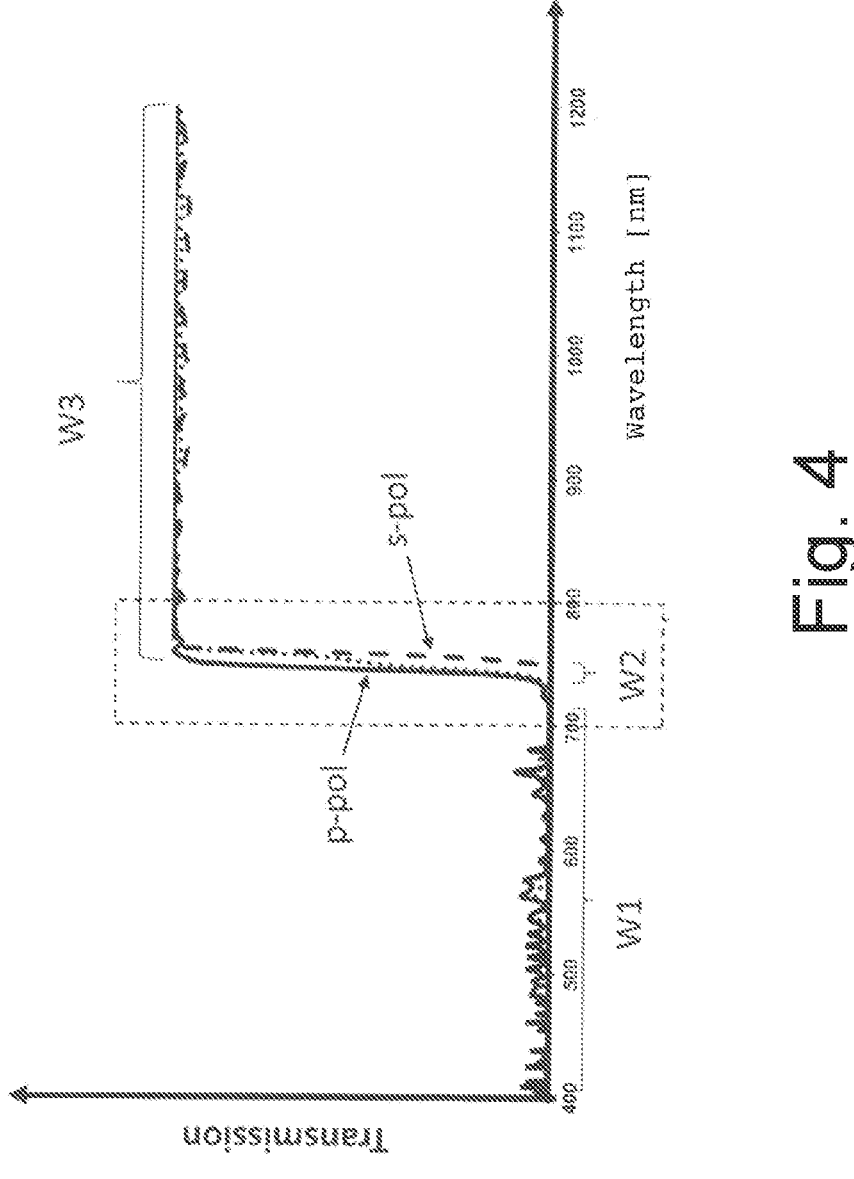
FIG. 4 shows a wavelength-dependent splitting characteristic of a dichroic beam splitter according to a comparative example.
Figure 5:
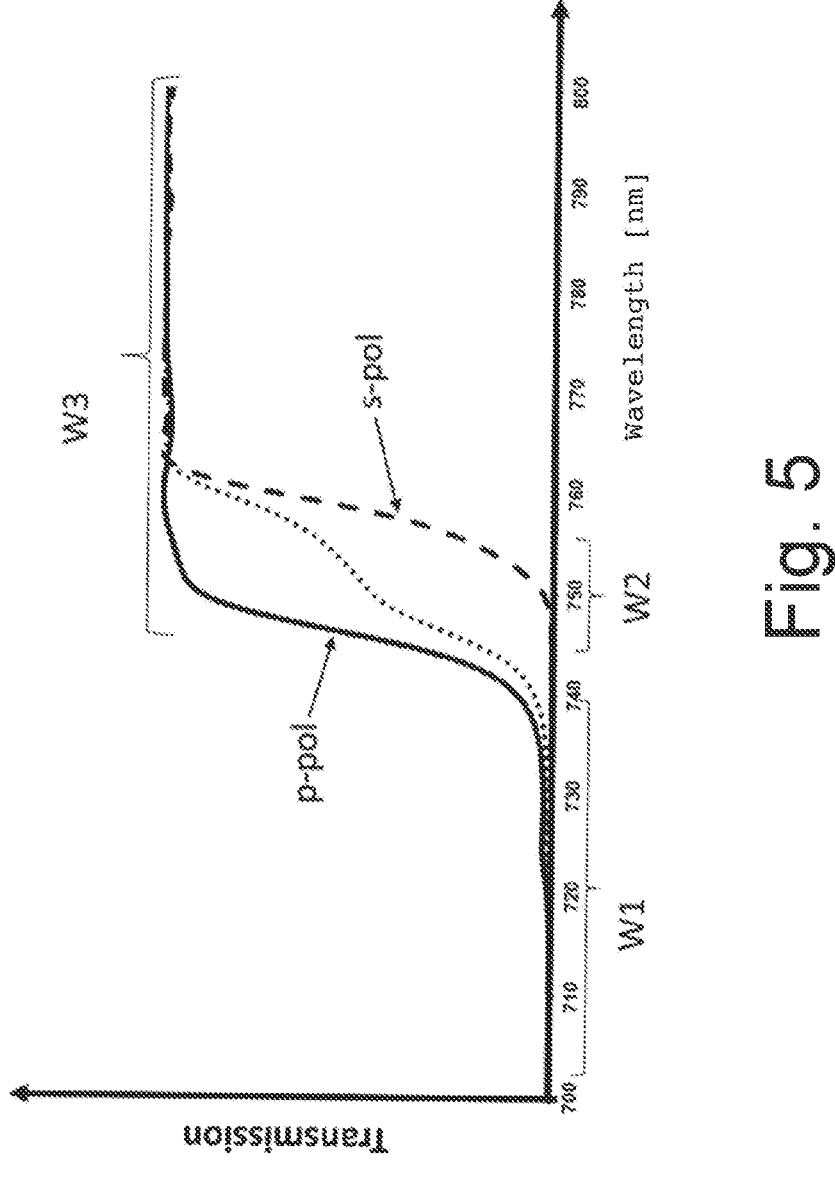
FIG. 5 shows the wavelength-dependent splitting characteristic according to the comparative example of FIG. 4 in a wavelength range around a splitting edge.

FIGS. 4 and 5 show a wavelength-dependent splitting characteristic of a dichroic beam splitter according to a comparative example. As can be seen from FIGS. 4 and 5, the wavelength-dependent splitting characteristic of a conventional dichroic beam splitter exhibits a splitting edge having a spectral width that is significantly smaller than the spectral width of the splitting edge of the beam splitter 116 according to the embodiment shown in FIG. 3. Specifically, the spectral width of the splitting edge of the comparative example is only about 10 nm.

Figure 6:
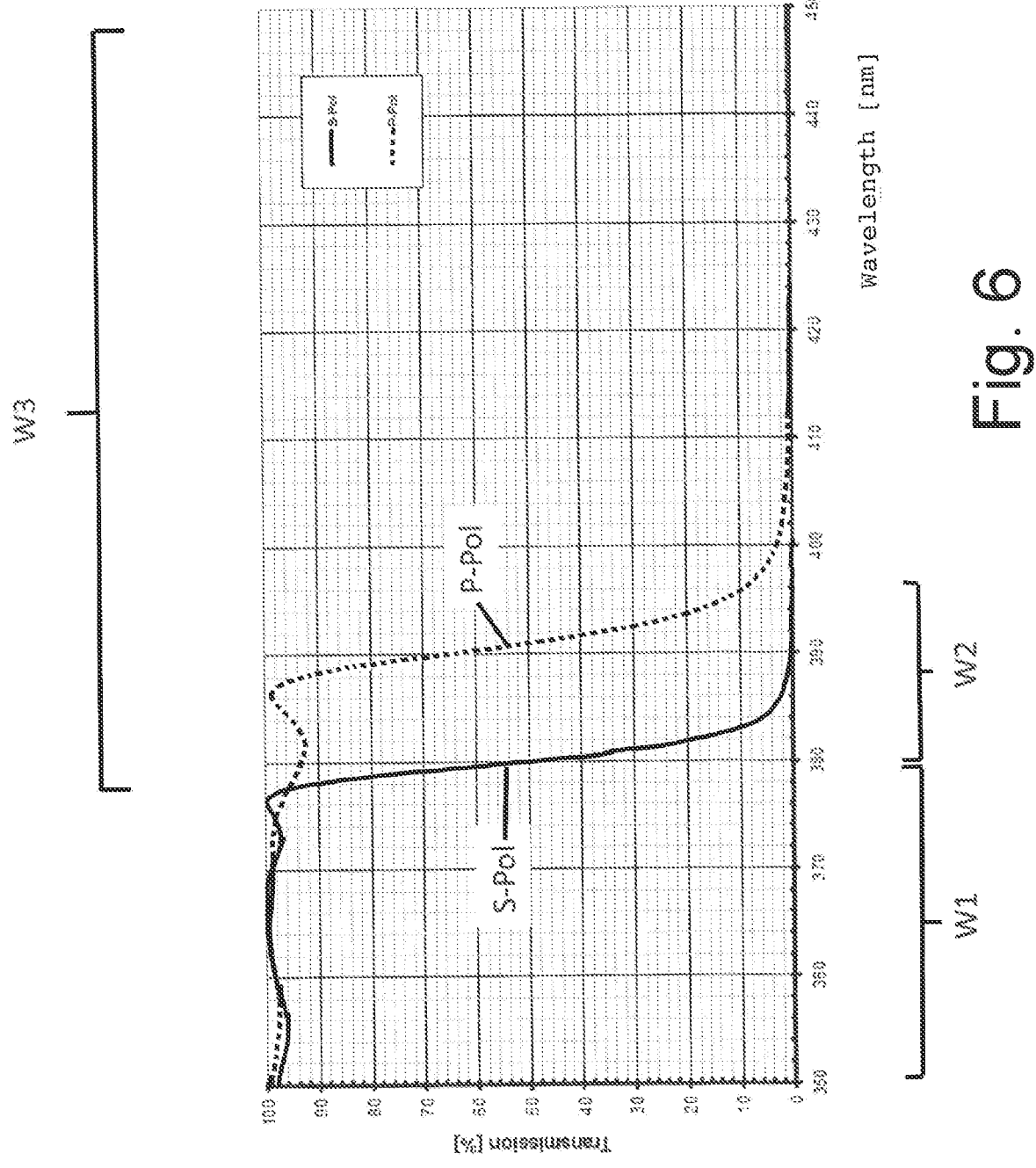
FIG. 6 is a graph showing an angular characteristic reducing the wavelength-dependent angular spread of the output light according to another embodiment.

In the above embodiment, the beam splitter 116 is configured to transmit the illumination light 106 and to reflect the detection light 122. However, according to an alternative embodiment, the beam splitter 116 may be designed to operate the opposite way, i.e. to reflect the illumination light 106 and to transmit detection light 122. FIG. 6 shows a wavelength-dependent splitting characteristic according to such an alternative embodiment.

According to the alternative embodiment illustrated in FIG. 6, in the first wavelength band W3–W2, the beam splitter reflects at least S-pol light. In the second wavelength W2, the beam splitter reflects S-pol light and transmits P-pol light. In the third wavelength band, the beam splitter transmits both S-pol and P-pol light.

As explained above, the beam splitter 116 is configured to have both dichroic-splitting properties and polarization-splitting properties that result in splitting characteristics as illustrated by way of examples in FIGS. 3 and 6. In particular, the beam splitter 116 has a unique polarization-dependent splitting characteristic at its spectral splitting edge, the spectral width thereof being adapted to the intermediate wavelength range W2 where the illumination light 106 and the detection light 122 spectrally overlap in specific applications such as SRS. In order to form a polarizing beam splitter with the aforementioned properties, an interference filter design as shown in FIG. 7 may be applied.

Figure 7:
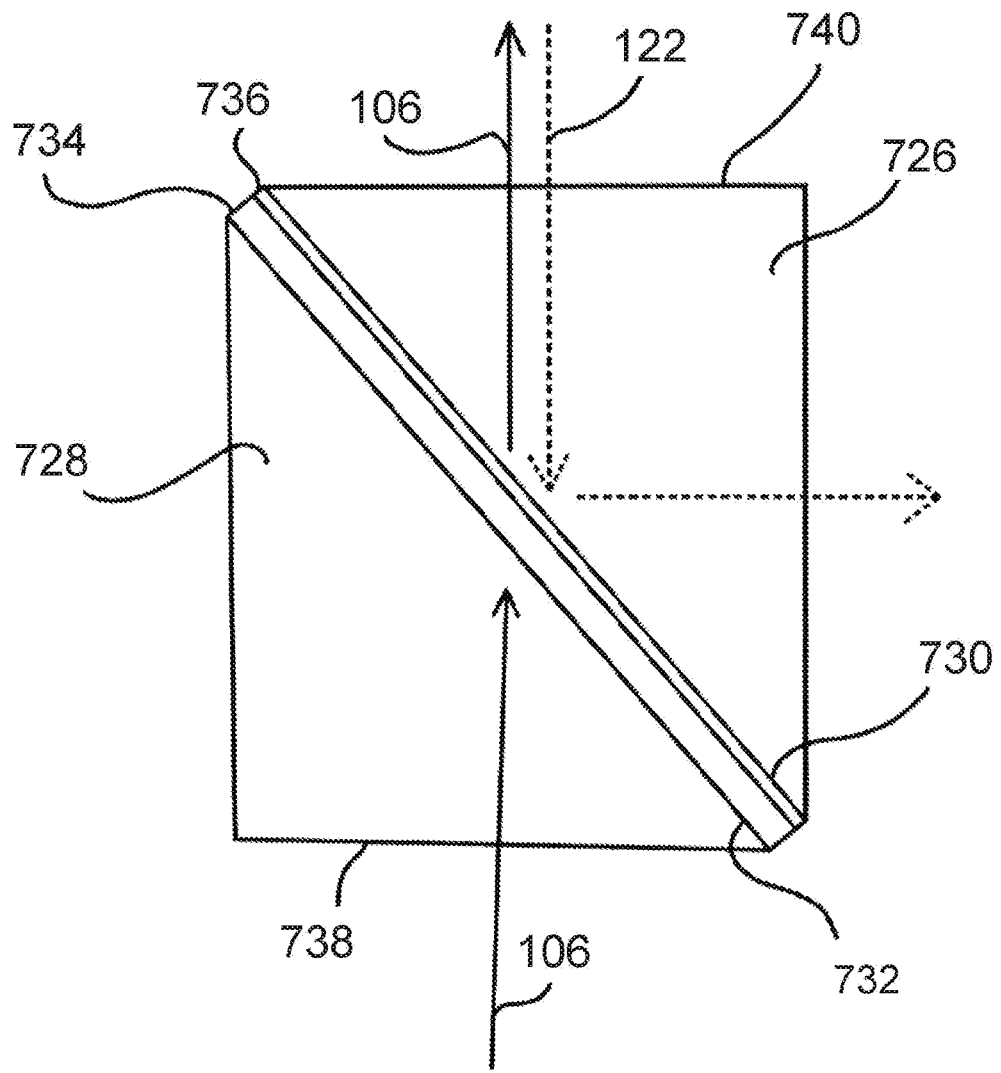
FIG. 7 is a schematic view showing a specific design of the beam splitter according to an embodiment.

According to the embodiment shown in FIG. 7, the beam splitter 116 is configured as an interference filter which is made from a cemented optical element including a first prism 726 and a second prism 728. Each of the first and second prisms 726, 728 may be formed from a triangular prism, wherein a hypotenuse face of one prism faces a hypotenuse face of the other prism. Specifically, the hypotenuse face of the first prism 726 is formed from a first coupling surface 730, and the hypotenuse face of the second prism 728 is formed from a second coupling surface 732.

The beam splitter 116 comprises a beam splitting coating 734. In the embodiment shown in FIG. 1, the beam splitting coating 734 is arranged on the second coupling surface 732 of the second prism 728. The beam splitting coating 734 is configured as a layer structure comprising a plurality of layers which form a dielectric interference filter that provides the intended wavelength-dependent transmission/reflection characteristics through constructive interference. The beam splitter 116 further includes a cement layer 736 which is arranged on the first coupling surface 730 of the first prism 726. The cement layer 736 serves to bond the coating 734 to the first prism 726.

Figure 8:
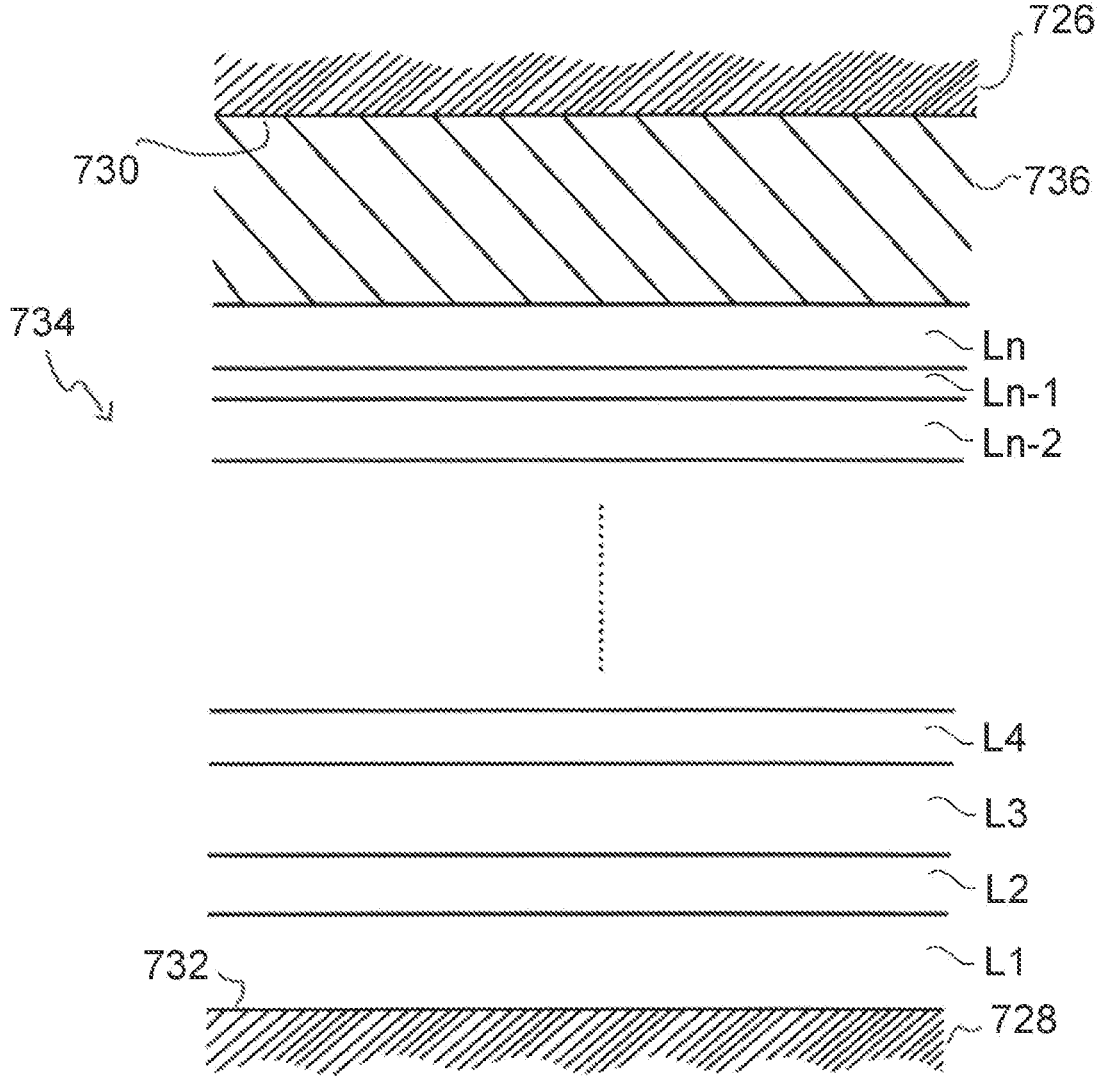
FIG. 8 is a schematic view of a layer structure of the beam splitter according to the embodiment.
Figure 9:
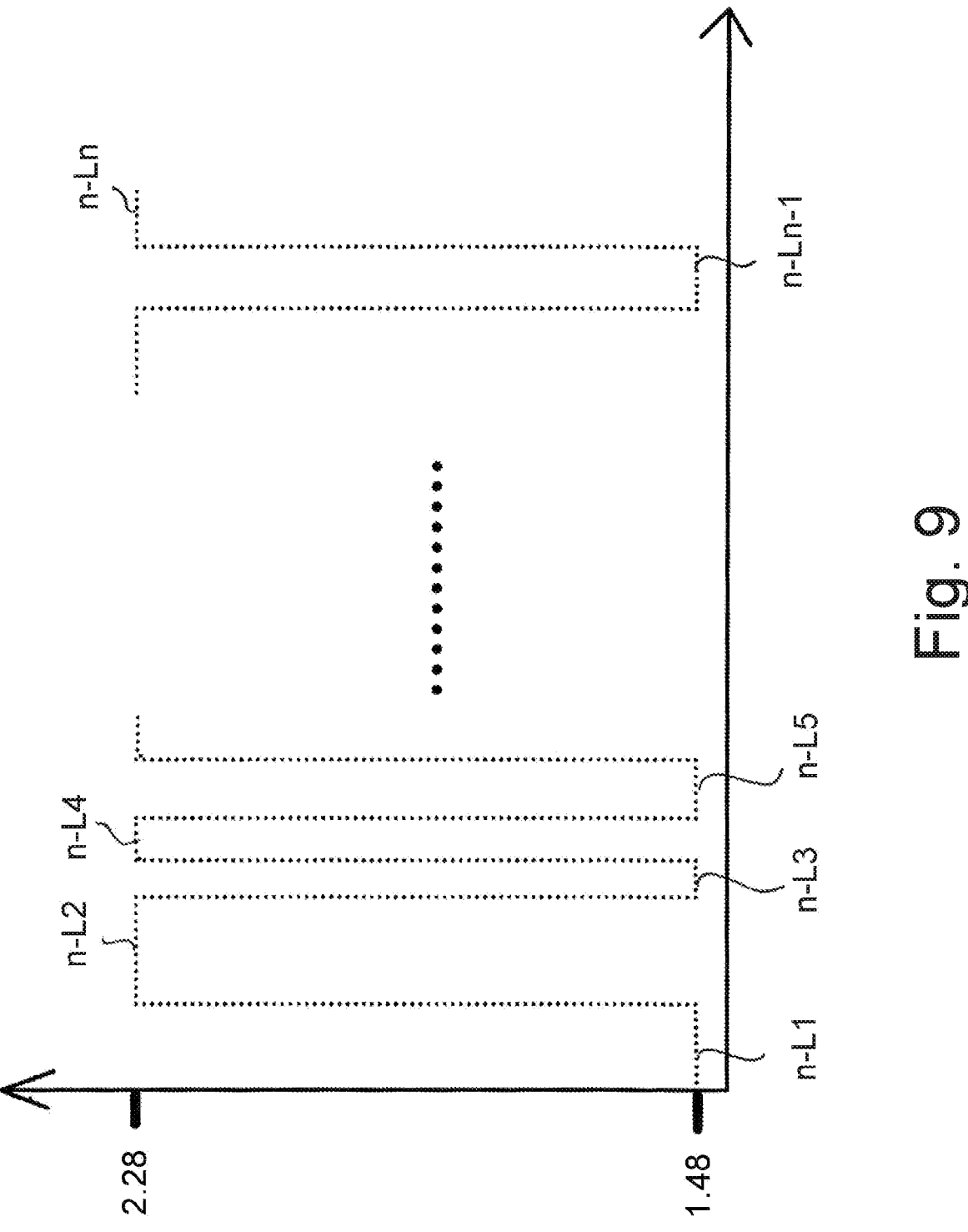
FIG. 9 is a diagram showing an alternating sequence of refractive indices of the layer structure according to the embodiment.

As shown in FIGS. 8 and 9, the beam splitting coating 734 comprises a plurality of first layers L1, L3, . . . , Ln–1 having first refractive indices n-L1, n-L3, Ln–1 and a plurality of second layers L2, L4, Ln having second refractive indices n-L2, n-L4, n-Ln. Within the coating 734, the first layers and the second layers are arranged in an alternating sequence, i.e. the first layer L1 is followed by the second layer L2, the second layer L2 is followed by the next first layer L3, the next first layer L3 is followed by the next second layer L4, and so forth. Thus, according to the present example, the first layers L1, L3, . . . , Ln–1 are designated by odd subscripts 1, 3, . . . , n–1, while the second layers are designated by even subscripts 2, 4, . . . , n (where n is an integer). In the present example, it is further assumed that the very first layer L1 of the coating 734 is arranged on the coupling surface 732 of the second prism 728, while the very last layer Ln of the coating 734 faces the cement layer 736 which is arranged on the coupling surface 730 of the first prism 728.

According to the present embodiment, the first refractive indices n1, n3, . . . , n-Ln–1 of the first layers L1, L3, . . . , Ln–1 are smaller than the second refractive indices n2, n4, n-Ln of the second layers L2, L4, Ln. In particular, the first refractive indices n1, n3, . . . , n-Ln–1 of the first layers L1, L3, . . . , Ln–1 may be identical. According to the example shown in FIG. 9, each of the first refractive indices n1, n3, . . . , n-Ln–1 of the first layers L1, L3, . . . , Ln–1 has a value of about 1.48. Likewise, the second refractive indices n2, n4, n-Ln of the second layers L2, L4, Ln may be identical. According to the example shown in FIGS. 2 and 3, each of the second refractive indices n2, n4, n-Ln of the second layers L2, L4, Ln has a value of about 2.28. In FIG. 9, the abscissa indicates the thicknesses of the different layers L1, L2, . . . , Ln, and the ordinate designates the refractive indices of the layers.

As can be seen from FIGS. 8 and 9, the thicknesses of the first layers L1, L3, . . . , Ln–1 may vary. According to the present embodiment, the thicknesses of the first layers L1, L3, . . . , Ln–1 vary in a range from 0.1 nm to 5000 nm. Likewise, the thicknesses of the second layers L2, L4, Ln may vary. According to the present embodiment, the thicknesses of the second layers L2, L4, Ln are in a range from 0.1 nm to 5000 nm.

In this example, each of the first layers L1, L3, . . . , Ln–1 of the coating 110 is made from $SiO_2$, while each of the second layers L2, L4, Ln of the coating 110 is made from ZnS. Alternatively, the first layers may be made from a metal fluoride or a metal oxide, in particular selected from a group including Cryolite, NbF3, Y2O3, CeF3, AlF3, LaF3, MgF2, YF3, YbF3, NaAlF3, and Al2O3. Furthermore, the second layers may be made from a metal fluoride or a metal oxide, in particular selected from a group including Y2O3, ITO, HfO2, Ta2O5, ZrO2, TiO2, and Nb2O5.

The cement layer 736 may have a refractive index in a range from 1.0 to 2.0 and a thickness in a range from 500 μm to 10 nm. In case that the refractive index of the cement layer 736 is relatively large, P-pol light is only weakly reflected by the cement layer 736. Accordingly, the specific filter design as explained above is adapted to a multimodal configuration in which P-pol light is used to illuminate the sample 102.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 optical apparatus
102 sample
104 illumination unit
106 illumination light
108 detection unit
110 detector
112 detector
114 light separating device
116 beam splitter
118 wave plate
120 dichroic splitting element
122 detection light
726 prism
728 prism
730 coupling surface
732 coupling surface
734 coating
736 cement layer
738 lower surface
L1 to Ln layers
N1 to Ln refractive indices

The invention claimed is:

1. An optical apparatus for examining a sample, the optical apparatus comprising:
an illumination unit configured to emit illumination light in an illumination wavelength range onto the sample;
a detection unit configured to collect detection light in a detection wavelength range from the sample, the illumination wavelength range and the detection wavelength range partially overlapping in an intermediate wavelength range; and
a light separating device configured to separate the illumination light and the detection light, the light separating device comprising a beam splitter,
wherein the beam splitter is a polarization-dependent beam splitter, such that:
in a first wavelength range including the illumination wavelength range and excluding the intermediate wavelength range, the beam splitter transmits both light in a first polarization state and light in a second polarization state;
in a second wavelength range including only the intermediate wavelength range, the beam splitter transmits the light in the first polarization and reflect the light in the second polarization state; and

in a third wavelength range including the detection wavelength range excluding the intermediate wavelength range, the beam splitter reflects both the light in the first polarization state and the light in the second polarization state.

2. The optical apparatus of claim 1, wherein the first and second polarization states comprise linearly polarized states which are orthogonal to each other.

3. The optical apparatus of claim 1, wherein the light separating device comprises at least one dichroic beam splitting element arranged in an optical path of the detection light output from the beam splitter, the dichroic beam splitting element having a splitting characteristic in the detection wavelength range with transmitting light in one of the detection wavelength range excluding the intermediate wavelength range and the intermediate wavelength range and reflecting light in an other of the detection wavelength range excluding the intermediate wavelength range and the intermediate wavelength range.

4. The optical apparatus of claim 3, wherein the illumination unit is configured to emit the illumination light in a linearly polarized state towards the beam splitter.

5. The optical apparatus of claim 3, wherein the light separating device comprises a wave plate arranged in a common optical path of the illumination light output from the beam splitter and the detection light input to the beam splitter.

6. The optical apparatus of claim 5, wherein the wave plate is configured to set a polarization state of the detection light in the detection wavelength range to the second polarization state.

7. The optical apparatus of claim 3, wherein the beam splitter has a splitting edge whose spectral width thereof is adapted to the intermediate wavelength range.

8. The optical apparatus of claim 1, wherein the illumination light is formed from the light transmitted by the light separating device, and the detection light is formed from the light reflected by the light separating device.

9. The optical apparatus of claim 1, wherein the illumination wavelength range has first lower and upper limits, and the detection wavelength range has second lower and upper limits, the first upper limit being larger than the second upper limit, the first lower limit being smaller than the second upper limit and larger than the second lower limit, and the intermediate wavelength range being defined by the first lower limit and the second upper limit.

10. The optical apparatus of claim 3, wherein the beam splitter comprises an interference filter including an optical coating comprising a plurality of dielectric layers.

11. The optical apparatus of claim 10, wherein the interference filter comprises a first prism having a first coupling surface on which the optical coating is arranged, a second prism having a second coupling surface which faces the first coupling surface, and a cement layer which is arranged between the optical coating and the second coupling surface and configured to bond the first and second prisms together.

12. The optical apparatus of claim 1, further comprising:
a multimodal microscope configured to perform multiphoton excitation microscopy, Coherent anti-Stokes Raman Scattering microscopy, Stimulated Raman Scattering microscopy, Second-Harmonic Generation microscopy, and/or Third-Harmonic Generation microscopy.

13. The optical apparatus of claim 12, wherein the multimodal microscope is configured to illuminate the sample with the illumination light in the illumination wavelength range when performing multiphoton excitation microscopy, Coherent anti-Stokes Raman Scattering microscopy, Stimulated Raman Scattering microscopy, Second-Harmonic Generation microscopy, and Third-Harmonic Generation microscopy, wherein the multimodal microscope is configured to collect the detection light from the sample in the detection wavelength range excluding the intermediate wavelength range when performing multiphoton excitation microscopy, Coherent anti-Stokes Raman Scattering microscopy, Second-Harmonic Generation microscopy, and Third-Harmonic Generation microscopy, and wherein the multimodal microscope is configured to collect the detection light from the sample in the intermediate wavelength range when performing Stimulated Raman Scattering microscopy.

14. The optical apparatus of claim 1, wherein the intermediate wavelength range has a spectral width of at least 50 nm.

15. The optical apparatus of claim 1, wherein the one of light transmission and light reflection of at least the first polarization state is at least 80% in the illumination wavelength range excluding the intermediate wavelength range, wherein the one of light transmission and light reflection of the first polarization state is at least 80% and an other of light transmission and light reflection of the second polarization state is at least 80% in the intermediate wavelength range, and the other of light transmission and light reflection of both the first polarization state and the second polarization state is at least 80% in the detection wavelength range excluding the intermediate wavelength range.

16. A method for examining a sample, comprising:

emitting illumination light in an illumination wavelength range onto the sample; and collecting detection light in a detection wavelength range from the sample, the illumination wavelength range and the detection wavelength range partially overlapping in an intermediate wavelength range, the illumination light and the detection light being separated by a light separating device comprising a beam splitter, wherein the beam splitter is a polarization-dependent beam splitter, such that:

in a first wavelength range including the illumination wavelength range and excluding the intermediate wavelength range, the beam splitter transmits both light in a first polarization state and light in a second polarization state;

in a second wavelength range including only the intermediate wavelength range, the beam splitter transmits the light in the first polarization and reflect the light in the second polarization state; and in a third wavelength range including the detection wavelength range excluding the intermediate wavelength range, the beam splitter reflects both the light in the first polarization state and the light in the second polarization state.

* * * * *